United States Patent [19]

Blum et al.

[11] 4,400,497

[45] Aug. 23, 1983

[54] STORAGE STABLE, HEAT CURABLE MIXTURES OF POLYISOCYANATE AND POLYOL AND PROCESS FOR THEIR MANUFACTURE AND USE

[75] Inventors: Rainer Blum, Ludwigshafen; August Lehner, Roedersheim-Gronau, both of Fed. Rep. of Germany; Hans-Uwe Schenck, Grosse Ile, Mich.

[73] Assignee: BASF Aktiengesellschaft, Ludwigshafen, Fed. Rep. of Germany

[21] Appl. No.: 356,955

[22] Filed: Mar. 11, 1982

[30] Foreign Application Priority Data

Mar. 27, 1981 [DE] Fed. Rep. of Germany ....... 3112054

[51] Int. Cl.$^3$ .............................................. C08G 18/80
[52] U.S. Cl. .................................. 528/45; 427/388.1; 528/73; 528/85; 528/902
[58] Field of Search ...................... 528/45, 73, 85, 902; 427/388.1

[56] References Cited

U.S. PATENT DOCUMENTS

| | | | |
|---|---|---|---|
| 2,858,298 | 10/1958 | Burt | 260/77.5 |
| 3,963,710 | 6/1976 | Aufdermarsh | 528/902 |
| 4,138,376 | 2/1979 | Nicks | 260/858 |

Primary Examiner—Maurice J. Welsh
Attorney, Agent, or Firm—David L. Hedden; Joseph D. Michaels

[57] ABSTRACT

The invention relates to mixtures comprising of
(a) a polyisocyanate in the form of discrete particles having diameters of 0.1 to 150 microns which are deactivated at their surface such that from 0.5 to 20 equivalent percent of the total isocyanate groups present are deactivated; and
(b) a polyol.

These mixtures are useful as coatings and adhesives as well as gasket materials and are particularly useful as undercoating materials for automotive vehicles.

9 Claims, No Drawings

STORAGE STABLE, HEAT CURABLE MIXTURES OF POLYISOCYANATE AND POLYOL AND PROCESS FOR THEIR MANUFACTURE AND USE

BACKGROUND OF THE INVENTION

1. Field of the Invention

The invention relates to mixtures of a polyisocyanate and a polyol which are storage stable at room temperature and are heat curable wherein the polyisocyanate, in the form of discreet particles which are deactivated on their surface, is dispersed in the polyol. The mixtures are used for coating metals and are particularly useful for undercoating motor vehicles.

2. Description of the Prior Art

The preparation of mixtures containing polyisocyanates and binders, which contain groups which are reactive with isocyanate groups, and their use is known.

Great difficulties, however, are incurred because the isocyanate group reacts with the binder, for instance, polyols or polyamines, at room temperature. Thus storage-stable combinations cannot be formulated.

In order to avoid this difficulty, two component systems are frequently used. The polyisocyanate and binder are stored in separate containers and are mixed immediately prior to application whereupon the reaction will then take place either spontaneously or by using heat and/or a catalyst. An example of such a system is described in U.S. Pat. No. 4,029,626. The drawbacks of this process lie in the need for the separate preparation and storage of the two components, the difficulties in the accurate metering and effective mixing prior to application, and in the danger of plugging the mixing and application equipment as a result of an early reaction.

Another familiar method for the manufacture of storage-stable polyisocyanate masses is based on non-crosslinked prepolymers which contain little free isocyanate and where moisture in the air serves as a crosslinking agent. This method is described, for instance, in French Pat. No. 1,237,936. Some of the problems with this method are that the curing from the surface towards the depth of the coating progresses very slowly, the final properties are reached only after weeks or months, and no curing takes place, for instance, between large areas or in hollow spaces.

Stable systems may also be formulated when the polyisocyanates are initially reacted with a monofunctional capping agent. The resultant adducts are referred to as capped or blocked isocyanates if they are less thermally stable than the products which are ultimately formed by the crosslinking reaction. Under the effects of heat, the capping agent is separated and the polyisocyanate enters into the more thermally stable bond which is accompanied by a crosslinking process. This principle is described, for instance, in the Vieweg/Hoechtlen, *Plastics Handbook*, vol. VII, page 11 ff, "Polyurethanes" (Carl Hanser Publishers, Munich, 1966), and is also the basis for a series of patents, for instance, German application No. 2,640,295, German application No. 2,612,638, German application No. 2,639,491 and-/or European Patent application No. 0 000 60. Technical and economic drawbacks of such formulations result because of the separated capping agent which, if it remains in the crosslinked mass, changes the properties of this mass or, if it evaporates, must be reclaimed or must be removed from the air.

In German application No. 1,570,548 and German published application No. 2,842,805, polyisocyanates melting at above 100° C. or at above 130° C. are described which result in storage-stable combinations when reacted with certain polyols. The products can be cured and used as coatings for textiles and/or textile hoses. The technical drawback of these products is that they depend upon a very narrow selection of specially structured polyols in order to achieve good storage stability and are, therefore, not at all suited for a number of applications.

In view of the mixtures and processes described, there is a need to develop storage-stable, heat curable liquid to paste-like mixtures of polyisocyanate and polyol which do not have the above-referenced drawbacks.

SUMMARY OF THE INVENTION

The subject invention relates to a mixture comprising
(a) a polyisocyanate in the form of discrete particles having diameters of 0.1 micron to 150 microns which are deactivated at their surface such that from 0.5 to 20 equivalent percent of the total isocyanate groups present are deactivated; and
(b) a polyol.

The mixtures are storage-stable at room temperature and are heat curable. They may also contain other ingredients such as protective colloids, inert solvents, plasticizers, pigment, fillers, dyes or other auxiliaries commonly used in the coating technology.

Primary or secondary amines or water are preferably used for the deactivation.

When preparing the mixtures, the polyisocyanate is dispersed in the polyol at temperatures below 40° C. and the deactivation agent is either already contained in the polyol or is at least partially subsequently added to the dispersion of the polyisocyanate in the polyol.

The mixtures are used as coating agents, adhesives, and as gasket materials on metals and non-metals and are particularly useful as undercoating for motor vehicles.

The present invention eliminates the drawbacks described in the prior art statement. Only part of the isocyanate groups is used for the deactivation so that the inside of the particles still remain reactive.

During heat curing, the phase separation is eliminated by dissolution or melting and the crosslinking process takes place.

DESCRIPTION OF THE PREFERRED EMBODIMENT

Suitable polyisocyanates which can be used to prepare the subject mixtures are the commonly used aliphatic, cycloaliphatic, and aromatic di- and polyisocyanates which are obtained, for instance, by the reaction of diisocyanates with di-, or polyols; or those prepared by the dimerization of diisocyanates into uretdiones, or their trimerization into isocyanurates; or those prepared by reacting diisocyanates with amines or water to form biurets. Among others, the following diisocyanates are suitable for use in preparing the polyisocyanate; diphenylmethane diisocyanate, toluene diisocyanate, isophorone diisocyanate and hexamethylene diisocyanate.

Preferred polyisocyanates are polyisocyanates which are solid at room temperature, for instance, the addition product of toluene diisocyanate and trimethylol propane, or the isocyanate prepared from three moles of toluene diisocyanate, or the particularly difficult to dissolve powdered dimerized toluene diisocyanate containing uretdione groups.

Suitable polyols which can be used to prepare the subject mixtures are polyester polyols, polyether polyols, and hydroxyl group containing polymers commonly used in preparing polyurethanes, for instance, copolymers of olefinicly saturated monomers without active hydrogen atoms and olefinicly unsaturated monomers with active hydrogen atoms.

Suitable monomers without active hydrogen atoms which can be used to prepare copolymers include vinyl aromatics such as styrene or vinyl toluene, olefins such as ethylene or propylene, esters of acrylic or methacrylic acid such as butylacrylate, 2-ethylhexylacrylate, methylmethacrylate, vinyl esters of straight chained or branched carboxylic acids such as vinyl acetate or vinyl propionate, as well as vinyl ether such as vinyl isobutyl ether.

Suitable monomers containing hydrogen atoms which can be used to prepare the copolymers include mono(meth)acrylate of multifunctional, particularly bifunctional alcohols such as butane diol monoacrylate, hydroxypropyl(meth)acrylate; other copolymerizable olefinicly unsaturated hydroxyl group containing compounds such as vinyl glycol; as well as copolymerizable olefinicly unsaturated compounds with amine and/or amide groups such as acrylamide and methacrylamide.

The subject mixtures according to this invention contain the polyisocyanates in form of discrete particles with particle diameters between 0.1 micron to 150 microns, preferably 1 micron to 50 microns, dispersed in a polyol such that the ratio of isocyanate groups of the polyisocyanate to hydroxyl groups of the polyol is generally from 0.5:1 to 1:0.5, preferably 0.9:1 to 1:0.9.

The dispersed polyisocyanate particles are deactivated at the surface so that no reaction of the polyisocyanate particles with the polyol occurs at room temperature.

The deactivating agent is advantageously chosen in such a manner that it is bonded to the surface of the polyisocyanate particles by chemical or physical properties thereby causing a phase separation between the polyisocyanate particles and polyol.

For the chemical deactivation 0.5 to 20, preferably 1 to 10, equivalent percent of the total present isocyanate groups are reacted with the deactivating agent.

Deactivating agents which may be used include water, mono- and polyamines, and mono- and polyalcohols. Particularly well suited are longer chained monoamines such as stearylamine, which react to form a type of grafted emulsifier. Higher molecular weight polyamines such as polyamide amines and hydroxyl-capped polymers such as hydroxyl-capped polybutadiene oils react by forming grafted protective colloids. Particularly well suited for the deactivation of the isocyanate groups at the surface of the polyisocyanate particles, that is, for the stabilization of the isocyanate/polyol dispersions, are also reactions which result in urea and/or polyurea structures at the surface of the polyisocyanates since these are insoluble in most polyols and organic solvents. Reagents forming such ureas or polyureas are water and primary or secondary amines, with short chained diamines such as ethylene diamine or propylene diamine being preferred.

The polyureas formed from these short chained diamines are more organophobic than those formed from longer chained diamines and thus have a greater stabilizing effect. A preferred process is based upon difficult-to-dissolve powdered dimerized toluene diisocyanate. Since the isocyanate reacts considerably faster with primary amines than with polyols, stirring powdered dimerized toluene diisocyanate into, for instance, ethylene diamine containing polyether polyol can immediately result in a storage-stable mixture.

An advantage of this process is the fact that the urea structures further react with additional isocyanates at higher temperature forming biuret structures, that is, the deactivating agent is incorporated in the crosslinked system and does not leave any inhomogeneity.

In a particular version, the subject mixtures may further contain 0.5 to 60 percent of commonly used plasticizers such as the esters of phthalic, adipic, sebacic and phosphoric acid, high boiling hydrocarbons, chlorinated hydrocarbons, epoxidized natural oils or low molecular polyesters. Detailed explanations of plasticizers are provided in D. Weinmann, *Coating with Lacquers and Plastics*, page 103 et seq (W. A. Colomb Publishers, Stuttgart, 1967).

In order to accommodate special processing conditions or in order to achieve special effects, the subject mixtures according to this invention may contain other ingredients (generally in the polyol component) in quantities of 0.1 to 15 percent, for instance, inert solvents such as gasolines, esters, ketones, ethers, glycol ethers; pigments, such as lamp black, titanium dioxide; organic and inorganic pigments; fillers such as talcum, argillaceous earth, chalk and quartz powder; and dyes or other auxiliaries generally used in the coating industry.

The mixtures according to this invention are generally produced by using common dispersing and mixing equipment. The polyisocyanate is advantageously dispersed in the polyol at temperatures below 40° C., preferably at temperatures between 0° C. and 25° C. The polyol either already contains the entire amount of deactivator or the deactivator is added to the mixture shortly after the dispersing process.

At 25° C., the subject mixtures are storage stable for at least 3 months without incurring a loss in reactivity, or an irreversible change in the mass. A possibly occurring viscosity increase can be eliminated by simple stirring.

The mixtures according to this invention are generally cured at 70° C. to 180° C.

The mixtures according to this invention can be used in liquid or paste form and are suited as coating materials, adhesives, and gasket materials. Possible substrates are metals such as steel, aluminum, copper, and magnesium, which can also be covered with a ground coat, and non-metals such as glass, ceramics, and heat-resistant plastics.

The mixtures according to this invention are particularly useful as undercoating material for automotive vehicles.

The examples below are intended to explain the invention without, however, limiting the scope of its application.

Unless otherwise stated, the parts and percentages referred to in the examples are parts by weight and percentages by weight.

EXAMPLES

Part A and B of the Examples illustrate the preparation of a polyol and two polyisocyanates which can be used to prepare the mixtures which are the subject of the invention.

A. An approximately 70 percent solution of a hydroxyl group containing polyacrylate resin was prepared as follows: 300 parts of diethylhexylphthalate under nitrogen pad are heated to 170° C., and while stirring, a feed consisting of 315 parts of butylacrylate, 126 parts of methylmethacrylate, 119 parts of styrene, and 140 parts of hydroxypropylacrylate is added within 2 hours and a second feed consisting of 31.5 parts of t-butylperbenzoate is added within a period of 3 hours. A temperature of 170° C. is maintained for 2 hours.

B.(1) A stabilized dimeric toluene diisocyanate is prepared as follows: 50 parts of dimeric toluene diisocyanate are finely distributed in 150 parts of acetone using a dissolver. Then, 6 parts of water are added and the mixture is stirred at room temperature for 6 hours. The precipitate is removed by filtration and is dried at 40° C. in a vacuum for a period of 6 hours. A fine white powder (particle size 5 to 40 microns) is obtained.

B.(2) A stabilized dimeric toluene diisocyanate is prepared as follows: 100 parts of dimeric toluene diisocyanate are finely distributed in 300 parts of cyclohexane using a dissolver; under vigorous stirring, 1.73 parts of ethylene diamine are then added dropwise and the mixture is stirred at room temperature for 2 hours. The precipitate is removed by filtration and is dried under vacuum at 40° C. for 6 hours. A fine white powder (particle size 5 to 40 microns) is obtained.

COMPARISON EXAMPLE 1

For comparison purposes, 50 parts of the 70 percent solution of the hydroxyl group containing polyacrylate resin A and 27 parts of a dimerized toluene diisocyanate are homogenized by use of a dissolver.

EXAMPLE 1

Comparison Example 1 is duplicated except the stabilized product B (1) is used instead of the dimerized toluene diisocyanate.

EXAMPLE 2

Comparison Example 1 is duplicated except the stabilized product B (2) is used instead of the dimerized toluene diisocyanate.

COMPARISON EXAMPLE 2

For comparison purposes, 100 parts of hydroxyl group containing polyacrylate resin 65 percent in acidic ester (OH number of the solid resin is 80) and 16.6 parts of a dimerized toluene diisocyanate are mixed with a dissolver to form a homogeneous paste.

EXAMPLE 3

Comparison Example 2 is duplicated except the stabilized dimeric toluene diisocyanate B (1) is used instead of the dimeric toluene diisocyanate.

EXAMPLE 4

Comparison Example 2 is duplicated except the stabilized product B (2) is used instead of the dimeric toluene diisocyanate.

COMPARISON EXAMPLE 3

For comparison purposes, 84 parts of liquid commercially available polyether polyol having an OH number of 320, 86 parts of dimeric toluene diisocyanate, and 40 parts of diethylhexylphthalate are homogenized in a dissolver.

EXAMPLE 5

Comparison Example 3 is duplicated except the stabilized product B (1) is used instead of the dimeric toluene diisocyanate.

EXAMPLE 6

Comparison Example 3 is duplicated except the stabilized product B (2) is used instead of the dimeric toluene diisocyanate.

The material mixtures obtained in accordance with Examples 1–6 are easily flowable pastes. By way of a wiper having a gap height of 1 mm, these pastes are applied to degreased steel sheet and are crosslinked at 160° C. for 20 minutes. In all cases tough, elastic, clear coatings are obtained which have good adhesive properties.

After a storage period of 1 week at room temperature, the mixtures produced in accordance with Comparison Examples 1–3 can no longer be stirred and have solidified into lumpy, crumbly masses. The mixtures obtained in accordance with this invention, and according to Examples 1–6, are somewhat thickened after a week, but can be reliquefied to nearly the original consistency by stirring. Coatings of these stirred pastes do not differ at all from those made of fresh pastes.

Even after 2 to 3 weeks storage time, the mixtures produced in accordance with this invention can be reliquefied by stirring and can be processed into coatings with good mechanical properties.

The embodiments of the invention in which an exclusive privilege or property is claimed are defined as follows:

1. A mixture comprising
   (a) a polyisocyanate in the form of discrete particles having diameters of 0.1 micron to 150 microns which are deactivated at their surface such that from 0.5 to 20 equivalent percent of the total isocyanate groups present are deactivated; and
   (b) a polyol.

2. The mixture of claim 1 wherein the polyisocyanate is a dimeric toluene diisocyanate.

3. The mixture of claim 1 wherein the polyol is a hydroxyl group containing polyacrylate resin.

4. The mixture of claim 1, 2, and 3 wherein said polyisocyanate has been deactivated with a primary or secondary amine or water.

5. The mixture of claim 4 wherein the ratio of isocyanate groups of the polyisocyanate to hydroxyl groups of the polyol is from 0.9:1 to 1:09.

6. The mixture of claim 5 wherein said mixture is prepared by dispersing the polyisocyanate in the polyol at temperatures below 40° C.

7. The mixture of claim 6 wherein said mixture is prepared by adding the deactivating agent to the mixture of polyisocyanate and polyol.

8. The mixture of claim 5 wherein said mixture is prepared by adding the deactivating agent to the polyol before mixing the polyol with the polyisocyanate.

9. A process for coating a metal comprising
   (a) applying the mixture of claim 1 to said metal; and
   (b) curing the mixture.

* * * * *